United States Patent [19]

Carcia

[11] Patent Number: 5,082,749
[45] Date of Patent: Jan. 21, 1992

[54] PLATINUM OR PALLADIUM/COBALT MULTILAYER ON A ZINC OXIDE OR INDIUM OXIDE LAYER FOR MAGNETO-OPTICAL RECORDING

[75] Inventor: Peter F. Carcia, Wilmington, Del.

[73] Assignee: E. I. Du Pont de Nemours and Company, Wilmington, Del.

[21] Appl. No.: 634,791

[22] Filed: Dec. 27, 1990

Related U.S. Application Data

[63] Continuation of Ser. No. 494,207, Mar. 15, 1990, abandoned.

[51] Int. Cl.⁵ .................................................. G11B 5/66
[52] U.S. Cl. ..................................... 428/694; 428/900; 369/13; 369/14
[58] Field of Search ................. 428/611, 694, 900; 360/131, 135; 365/122; 369/13, 14

[56] References Cited

U.S. PATENT DOCUMENTS

| | | | |
|---|---|---|---|
| 4,587,176 | 5/1986 | Carcia | 428/611 |
| 4,670,323 | 6/1987 | Nakamura et al. | 428/694 |
| 4,678,721 | 7/1987 | de Broeder et al. | 428/611 |
| 4,690,861 | 9/1987 | Nakamura et al. | 428/694 |
| 4,788,095 | 11/1988 | Machida et al. | 428/694 |

FOREIGN PATENT DOCUMENTS

| | | |
|---|---|---|
| 304927 | 3/1989 | European Pat. Off. |
| 199236 | 9/1986 | Japan . |
| 242321 | 10/1986 | Japan . |
| 128019 | 6/1987 | Japan . |
| 169757 | 7/1989 | Japan . |

*Primary Examiner*—Merrell C. Cashion, Jr.
*Assistant Examiner*—Robert J. Follett

[57] ABSTRACT

This invention provides a magneto-optical recording medium comprised of a substrate, a base layer of zinc oxide or indium oxide sputtered onto the substrate and a multilayer recording film sputtered onto the base layer of zinc oxide or indium oxide, wherein the base layer or zinc oxide or indium oxide is from about 200 A to about 4500 A (about 20 nm to about 450 nm) thick, preferably from about 200 A to about 2000 A (about 20 nm to about 200 nm) thick, the multilayer recording film is a platinum/cobalt or a palladium/cobalt multilayer film consisting of alternating layers of platinum and cobalt or palladium and cobalt, and the substrate is transparent to the radiation used to record and read.

37 Claims, 2 Drawing Sheets

PLATINUM OR PALLADIUM/COBALT MULTILAYER ON A ZINC OXIDE OR INDIUM OXIDE LAYER FOR MAGNETO-OPTICAL RECORDING

This application is a continuation of Application Ser. No. 07/494,207 filed Mar. 15, 1990 is now abandoned.

1. Field of the Invention

This invention relates to a magneto-optical recording medium comprised of a platinum or palladium/cobalt multilayer film with a zinc oxide or indium oxide base layer between the multilayer film and the substrate.

2. References

Thin films with perpendicular magnetic anisotropy are potential candidates in high density magnetic and magneto-optical recording. Examples of materials useful in preparing such films include the oxide garnets and ferrites, amorphous rare-earth transition metal alloys, metal alloys such as CoCr, and metal multilayers of platinum/cobalt (Pt/Co) and palladium/cobalt (Pd/Co), as disclosed in P. F. Carcia, U.S. Pat. No. 4,587,176.

In order to be useful for magneto-optical recording, a material must have additional attributes besides perpendicular magnetic anisotropy. These requirements include a square hysteresis loop, a sufficient Kerr effect, a large room temperature coercivity $H_c$, and switching characteristics compatible with available laser power and magnetic field strength.

Pt/Co multilayers are a promising new candidate for a magneto-optical (MO) recording medium. They have perpendicular magnetic anisotropy, square hysteresis loops, a modest Kerr rotation, and excellent environmental stability. These attributes are discussed in detail in several recent publications, W. B. Zeper et al., J. Appl. Phys. 65, 4971 (1989), F. J. A. M. Greidanus, Appl. Phys. Lett. 54, 2481 (1989) and P. F. Carcia et al., Mat. Res. Soc. Symp. Proc., 159,115 (1989). When compared with the rare-earth transition-metal (RE-TM) alloys, the Pt/Co multilayer has superior corrosion resistance and a larger Kerr effect, i.e., a larger magneto-optical signal, at shorter wavelengths which allows higher density recording.

A magnetic coercivity $H_c$ of about 1000 Oe is adequate for some recording applications, but higher coercivities would be more attractive and facilitate practical applications. Pt/Co multilayers prepared by vapor-deposition, (electron-beam evaporation from separate Pt and Co sources) have $H_c$ of about 1000 Oe. Sputtering is the preferred manufacturing process for preparing these multilayer films because it is simpler than other processes and the results obtained are more reproducible. However, sputtered Pt/Co multilayers have coercivities too small for magneto-optical recording. For example, Ochiai et al., Jap. J. Appl. Phys. 28, L659 (1989) and Ochiai et al., Digest of the Int'l. Mag. Conf.-1989. Wash., D. C., report $H_c$ of only 100-350 Oe for sputtered Pt/Co multilayers which they prepared by using argon as the sputter gas. The commonly assigned patent application, "Improved Process for Sputtering Multilayers for Magneto-optical Recording", Ser. No. 441,499, filed Nov. 27, 1989, in the name of P. F. Carcia, discloses that sputtering Pt/Co multilayers in krypton or xenon gas instead of argon results in coercivities of the order of 1000 Oe, comparable to vapor deposited films.

A practical magneto-optical disk structure incorporates a transparent dielectric layer, i.e., a base layer, between the substrate and the magnetic layer. In addition, a similar dielectric layer may be deposited on the magnetic layer. The primary role of the dielectric layer is to enhance by optical interference the Kerr rotation of the magnetic layer and the reading efficiency. For example, Bernstein et al., IEEE Transactions on Magnetics, 21, 1613 (1985), discuss different dielectric configurations to increase the Kerr signal of rare-earth transition metal alloys. When the MO layer is a RE-TM alloy, e.g. TbFeCo, a dielectric layer deposited on the magnetic layer also serves to protect the very sensitive rare earth elements from oxidation, which can compromise their MO properties. Usually nitrides (e.g., $Si_3N_4$ or AlN) are used because most oxides are easily chemically reduced by the rare earth elements and are consequently no longer protective. Because Pt/Co multilayers are much less sensitive to oxidation, the choice of a dielectric enhancement layer is not restricted to nitrides and a dielectric layer is not needed to protect the magnetic layer from the atmosphere. As a result other materials can be used as the dielectric and a dielectric with a larger optical index of refraction can further increase the Kerr signal. In addition, the dielectric may be used as a base layer.

It is highly preferred to read and write with laser light incident from the substrate side of the MO structure because the relatively thick substrate defocuses the effects of any surface foreign particles so that they do not obstruct or distort the read/write process. Recording on the air incident side would require adding an additional thick defocusing layer on the magnetic layer.

Some attempts have been made to increase the coercivity of multilayers by using base layers. Y. Ochiai et al., EP 0304873 disclose studies of sputtered Pt/Co multilayers including the use of underlayers to increase $H_c$. The underlayer (base layer) was formed from a metal, at least one of Cu, Rh, Pd, Ag, Ir, Pt and Au having face-centered cubic structure and W having a body-centered cubic structure, or from dielectric materials, including oxides such as $Al_2O_3$, $Ta_2O_5$, MgO, $SiO_2$, $TiO_2$, $Fe_2O_3$, $ZrO_2$, or $Bi_2O_3$, nitrides such as ZrN, TiN, $Si_3N_4$, AlN, AlSiN, BN, TaN or NbN, or oxide-nitride composite materials, oxynitride compounds. However, generally only marginal improvements in $H_c$ were achieved and the singular best result of 725 Oe requires a 1000 Å (100 nm) thick Pt underlayer. This is impractical for most magneto-optical recording applications because it prohibits reading and writing information from the substrate side, and the large heat capacity and thermal diffusivity of such a thick Pt layer will likely prevent writing with the limited power available with current solid-state lasers. An Hc of 700 Oe was obtained with a 350 Å (35 nm) underlayer of $Ta_2O_5$ in conjunction with an about 600 Å (60 nm) $Ta_2O_5$ upper layer, i.e., on top of the multilayer, plus a Pt reflective layer on the $Ta_2O_5$ upper layer. Large increases in the $H_c$ of Pd/Co multilayers were achieved with Pt or Pd underlayers and $H_c$ increased from 825 Oe with no Pd underlayer to 3750 Oe with a 400 Å (40 nm) Pd underlayer. However, the Kerr effect for the Pd/Co multilayers is lower and therefore Pd/Co multilayers are less attractive than Pt/Co multilayers.

S. Hashimoto et al., Proceedings of the 13th Conference of the Applied Magnetics Association of Japan, p. 56 (1989), disclose the increase in $H_c$ of sputtered Pt/Co and Pd/Co multilayers by a metal base layer when the metal is a face-centered cubic metal or the body-centered cubic W. Pt and Pd were most effective. The maximum $H_c$ of about 1000 Oe for Pt/Co multilayers was obtained when the base layer thickness reached 400–500 Å (40–50 nm). Thicker base layers resulted in no further increase in $H_c$. If the multilayers are sputtered in krypton or xenon gas instead of argon as disclosed in the commonly assigned application discussed above, much larger coercivities can be achieved with the same Pt base layer thickness. However, as discussed above, such thick Pt layers are undersirable in most MO structures.

Y. Ochiai et al., Proceedings of the 13th Conference of the Applied Magnetics Association of Japan, p. 57 (1989), disclose the use of dielectric films as base layers for sputtered Pt/Co multilayers and present data that appears to be essentially the same as that discussed above in connection with Y. Ochiai et al., EP 0304873.

Y. Iwasaki et al., Proceedings of the 13th Conference of the Applied Magnetics Association of Japan, p. 129 (1989), state that if it were possible to increase the coercivity of Pt/Co multilayers using a nonmetallic transparent base layer to the degree shown by S. Hashimoto et al. (discussed above) using a Pt base layer, such films would be useful as MO disk materials. Y. Iwasaki et al. disclose the use of optically isotropic cubic metal oxides such as Co, Fe and Ni oxides as base layer materials. When a 400–600 Å (40–60 nm) base layer of cubic wustite-phase CoO is used, the coercivity of Pt/Co multilayer has increased to about 1000 Oe. If prepared properly a 200 Å (20 nm) base layer of CoO results in an Hc of 800 Oe. Fe or Ni oxide base layers resulted in an $H_c$ of 600 Oe.

In the commonly co-assigned application, "Method of Thermomagnetic Recording of Information and Optical Readout of the Stored Information and Also A Recording Element Suitable for Use in this Method", Ser. No. 384,587, filed July 24, 1989, dielectric layers of an inorganic oxide, nitride, selenide, etc. between the multilayer and the substrate are discussed. Examples of suitable materials are $Si_3N_4$, AlN, SiO, $SiO_2$, ZnO, $Zn_3N_2$, $ZnSi_3N_2$, ZnSe, $ZrO_2$, $TiO_2$, and $AlZrN_2$. Only AlN is exemplied.

The instant invention provides a base layer that is transparent, has a relatively large index of refraction (n > 1.8) and enhances the coercivity of Pt/Co multilayers to thereby provide a structure especially suitable for magneto-optical recording.

SUMMARY OF THE INVENTION

This invention provides a magneto-optical recording medium comprised of a substrate, a base layer of zinc oxide or indium oxide sputtered onto the substrate and a multilayer recording film sputtered onto the base layer, wherein the zinc oxide or indium oxide film is from about 200 Å to about 4500 Å (about 20 nm to about 450 nm) thick, preferably from about 200 Å to about 2000 Å (about 20 nm to about 200 nm) thick, the multilayer recording film is a platinum/cobalt (Pt/Co) or a palladium/cobalt (Pd/Co) multilayer film consisting of alternating layers of platinum and cobalt or palladium and cobalt, and the substrate is transparent to the radiation used to record and read. Argon, krypton, xenon or a mixture thereof can be used as the sputter gas when sputtering the multilayer, but it is preferred to use krypton, xenon or a mixture thereof as the sputter gas and to use a sputtering gas pressure of about 2 to about 12 mTorr (about 0.27 to about 1.6 Pa). Preferred is a platinum/cobalt multilayer film and more preferred is a platinum/cobalt multilayer film wherein all the cobalt layers have substantially the same thickness $d_{Co}$ and all the platinum layers have substantially the same thickness $d_{Pt}$, $d_{Co}$ is less than about 12 Å (1.2 nm), $d_{Pt}$ is less than about 24 Å (2.4 nm) and the total thickness of the platinum/cobalt multilayer film is less than about 750 Å (75 nm). Especially preferred is the platinum/cobalt multilayer film wherein $d_{Co}$ is from about 2 to about 5 Å (0.2 to about 0.5 nm) and $d_{Pt}/d_{Co}$ is from about 1 to about 5.

Surprisingly, the zinc oxide or indium oxide base layer not only enhances the Kerr rotation of the multilayer recording film but also enhances the magnetic coercivity. High coercivities and square magnetic hysteresis loops have been achieved with the magneto-optical recording medium of the invention. Coercivities as high as 3000 Oe have been observed with a Pt/Co multilayer film.

BRIEF DESCRIPTION OF THE DRAWING

The Drawing consists of two Figures.

DETAILED DESCRIPTION OF THE INVENTION

Figure 1A:
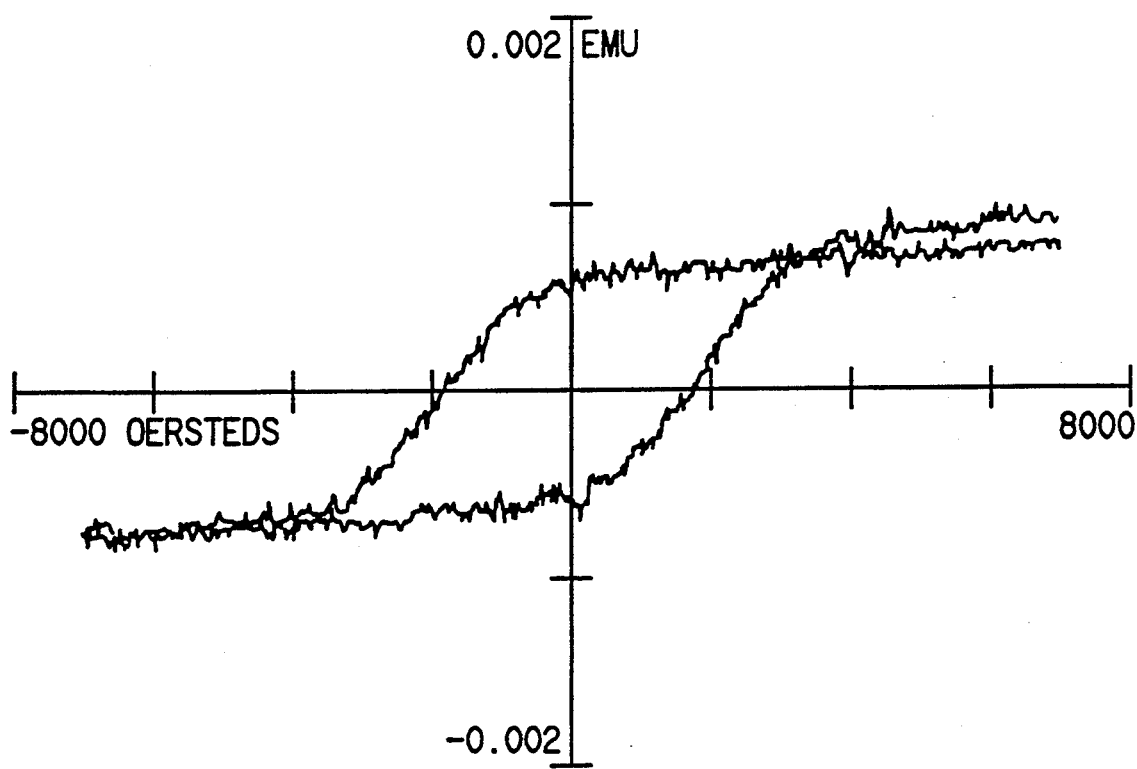
FIG. 1 shows a comparison of the squareness of a hysteresis loop obtained with a Pt/Co multilayer sputtered onto a non-etched zinc oxide base layer which has been exposed to room atmosphere with that obtained with a Pt/Co multilayer sputtered onto a similar zinc oxide base layer which has been etched after the exposure to room atmosphere.

The instant invention provides a superior magneto-optical (MO) recording medium. The presence of a base layer of zinc oxide or indium oxide between the multilayer recording film and the substrate provides this improvement over MO recording medium of the prior art. Zinc oxide and indium oxide are transparent to the radiation used in recording and reading and have indices of refraction, n, of about 2. It has now been found that a base layer of zinc oxide or indium oxide not only enhances the Kerr effect, but also significantly increases the coercivity of the multilayer recording film. Tin oxide may also be useful as a base layer to enhance both the Kerr effect and the magnetic coercivity. These oxides are preferably deposited onto the substrate by sputtering. $Si_3N_4$ is the most commonly used dielectric layer to enhance the Kerr effect, but no enhancement of the coercivity has been observed when it is used.

The oxide film can be deposited upon a variety of substrates, e. g., glass, quartz or a transparent plastic such as polycarbonate or polymethylmethacrylate. The substrate must be transparent to the radiation used to record on the multilayer recording film, as well as to the radiation used to read.

The multilayer recording film is deposited onto the oxide film by sputtering alternate layers of platinum and cobalt or palladium and cobalt. Argon, krypton, xenon or a mixture thereof can be used as the sputter gas when sputtering the multilayer, but it is preferred to use krypton, xenon or a mixture thereof as the sputter gas and to use a sputtering gas pressure of about 2 to about 12 mTorr (about 0.27 to about 1.6 Pa).

Pt/Co multilayers are preferred over Pd/Co multilayers because they exhibit a higher Kerr effect. As a result, the preferred magneto-optical recording medium of the invention is comprised of a substrate, a base layer of zinc oxide or indium oxide sputtered onto the substrate and a multilayer recording film sputtered onto the base layer, wherein the zinc oxide or indium oxide film is from about 200 A to about 4500 A (about 20 nm to about 450 nm) thick, preferably from about 200 A to about 2000 A (about 20 nm to about 200 nm) thick, the multilayer recording film is a platinum/cobalt multilayer film consisting of alternating layers of platinum and cobalt, and the substrate is transparent to the radiation used to record and read.

The platinum/cobalt multilayer film is deposited by sputtering alternate layers of platinum and cobalt. Preferably all cobalt layers within the multilayer film have substantially the same thickness $d_{Co}$ and all said platinum layers within the multilayer film have substantially the same thickness $d_{Pt}$. Preferably $d_{Co}$ is less than about 12 A (1.2 nm), $d_{Pt}$ is less than about 24 A (2.4 nm) and the total thickness of the multilayer film is less than about 750 A (75 nm). Most preferably $d_{Co}$ is from about 2 to about 5 A (0.2 to about 0.5 nm) and $d_{Pt}/d_{Co}$ is from about 1 to about 5. The preferred ranges set forth herein identify structures having the most suitable characteristics for magneto-optical recording.

DC or RF magnetron sputtering can be used to deposit the platinum/cobalt multilayer film. The substrates with the zinc oxide or indium oxide base layer are typically placed on a rotating table and exposed to the Pt and Co sputtering fluxes in alternate, repeating fashion. The motion of the table can be programmed to permit the table to pause for preselected periods during Pt and Co deposition. In this manner, the relative thicknesses of Pt and Co can be controlled. Preferably the Co and Pt targets are physically separated to eliminate the possiblity of overlap of their sputtered fluxes. While argon, krypton, xenon or a mixture thereof can be used as the sputter gas when sputtering the Pt/Co multilayer, it is preferred to use krypton, xenon or a mixture thereof as the sputter gas and to use a sputtering gas pressure of about 2 to about 12 mTorr (about 0.27 to about 1.6 Pa).

EXAMPLES OF THE INVENTION

EXAMPLES 1-33

In these Examples of the invention, the zinc oxide thin films were sputtered onto glass substrates in a diffusion-pumped vacuum system whose background pressure was about $5 \times 10^{31\ 6}$ Torr ($6.7 \times 10^{-4}$ Pa). Films were sputtered at a total argon plus oxygen pressure of 8 mTorr (1.1 Pa). An oxygen partial pressure of 1 mTorr (0.13 Pa) was used for Examples 1-9, 2 mTorr (0.27 Pa) was used for Examples 10-21, and 4 mTorr (0.53 Pa) was used for Examples 22-32. Zinc oxide film thicknesses ranged from 500 A to 4000 A (50 nm to 400 nm). X-ray diffraction results verified that all films were ZnO with the c-axis oriented perpendicular to the thin film plane. After the zinc oxide films were sputtered onto the glass substrates, the substrates were removed from this chamber, thereby exposing the zinc oxide film to the laboratory environment, and then transferred into another vacuum chamber for deposition of Pt/Co multilayers.

Several essentially identical zinc oxide films were prepared and prior to sputtering the multilayers, some of these zinc oxide films were sputter-etched under different, but mild, conditions in order to create a clean zinc oxide surface layer, i.e., to remove any contamination which may have occurred when the zinc oxide was exposed to the atmosphere during the transfer process.

Pt/Co multilayers were subsequently sputtered at 7 mTorr (0.94 Pa) of Kr on to uncoated and zinc oxide-coated glass and silicon substrates. All multilayer films were prepared by DC magnetron sputtering from separate 6.5" (16.5 cm) diameter Co and Pt targets. Forty watts was the sputtering power to each target. Substrates were on a rotatable table and were alternately coated by each metal. The substrate to target distance was about 3" (7.6 cm). There was no significant difference in results obtained with a glass substrate and those obtained with a polished silicon substrate. Glass substrates were used for the examples and experiments described herein. During deposition the rotating table was programmed to remain stationary under each target for a given time by controlling the substrate motion with a computer. Prior to deposition the vacuum chamber was pumped to a background pressure of about $2 \times 10^{-7}$ Torr ($2.7 \times 10^{-5}$ Pa) before admitting the sputtering gas.

A pair of adjacent layers of Pt and Co is referred to as a bilayer. The number of Pt layers and the number of Co layers are of course each equal to the number of bilayers. In all the Examples, 10 bilayers were used. The thickness $d_{Pt}$ of the Pt layers is 11.0 A (1.1 nm) and the thickness $d_{Co}$ of the Co layers is 3.5 A (0.35 nm).

The perpendicular magnetic hysteresis loops of films on zinc oxide-boated and uncoated glass substrates were measured and $H_c$ noted. All of these multilayer films have an easy axis of magnetization perpendicular to the film plane and a magnetic squareness equal to one, that is, the remanent magnetization at zero applied field equals the saturation value.

The composition of the sputter gas used in sputtering the zinc oxide films, the thickness of the zinc oxide films, the sputter cleaning conditions, i.e., the voltage and time of sputtering, used to etch the zinc oxide films and the $H_c$ are shown in Table I. For comparison, the same multilayer on a glass substrate with no base layer has an $H_c$ of about 850 Oe.

Figure 1B:
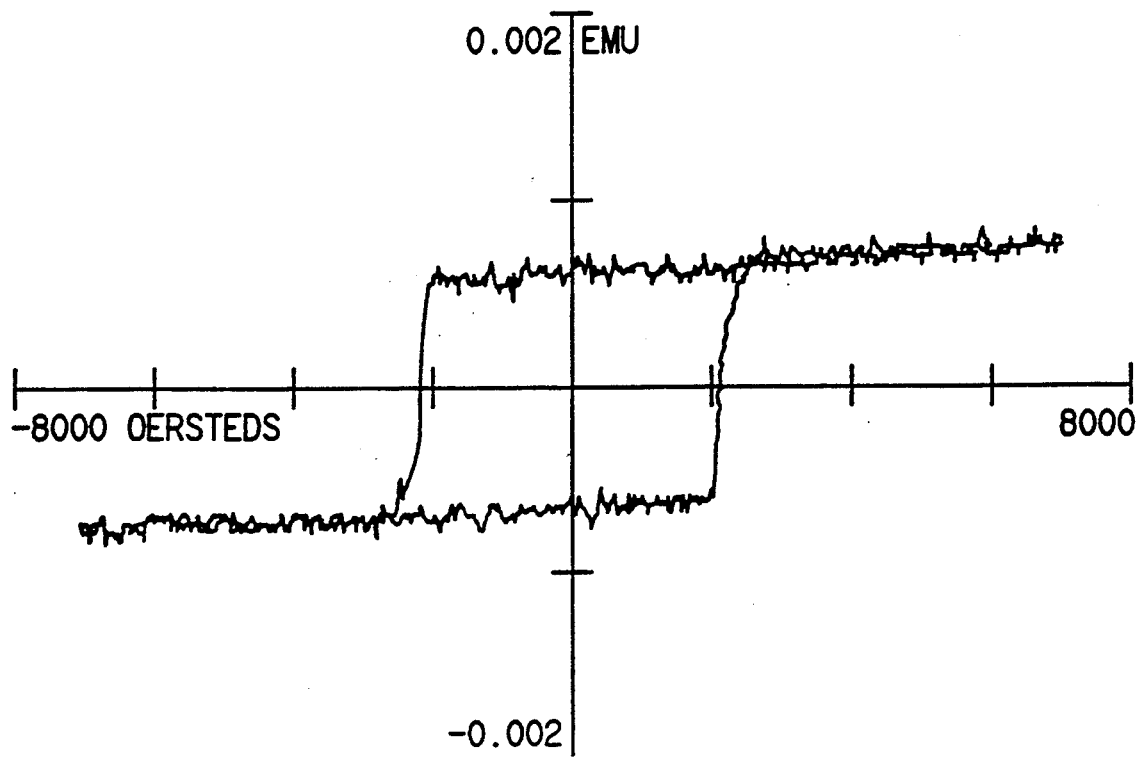
Figure 2:
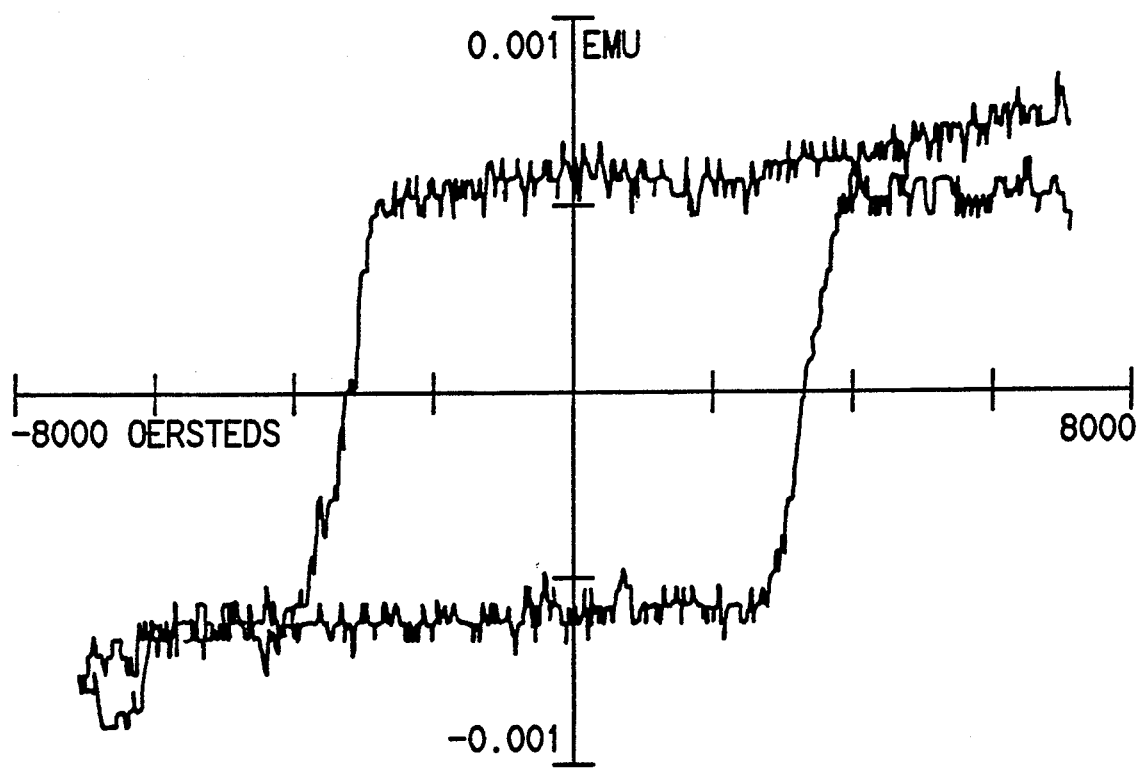
FIG. 2 shows a hysteresis loop obtained with a Pt/Co multilayer sputtered onto a non-etched zinc oxide base layer which has not been exposed to room atmosphere.

Multilayer films sputtered on zinc oxide had substantially larger coercivities than those sputtered directly on glass. The magnitude of Hc depends only weakly on the zinc oxide preparation conditions and the zinc oxide thickness, and more strongly on the sputter-etch or cleaning conditions. In general, when the zinc oxide had been exposed to the atmosphere, etching the zinc oxide layer improved the squareness of the magnetic hysteresis loop compared to that of unetched zinc oxide layers. FIG. 1 illustrates this improvement and shows a plot of the hysteresis loops obtained from Example 30 with no etching and that of Example 31 with etching before the deposition of the multilayer. Milder etching conditions only slightly affected the magnitude of $H_c$, either increasing it or decreasing it slightly relative to the $H_c$ obtained with the unetched zinc oxide. Larger etch voltages and longer etch times always decreased $H_c$, although they improved the square shape of the hysteresis loop. If the etching voltage is too large or the etching time too long, the zinc oxide surface may become roughened and this consequently decreases the coercivity. It is believed that the key role of etching is to clean and restore the zinc oxide surface to its condition prior to removing the film from the vacuum chamber in which it was deposited. Therefore depositing the zinc oxide layer and the Pt/Co multilayers in the same vacuum chamber may eliminate the need for sputter-etching to clean the zinc oxide surface. This is demonstrated in Example 33 in which essentially the same Pt/Co multilayer film sputtered in all the other Examples was deposited onto a 1000 A (100 nm) zinc oxide layer in the same vacuum chamber without exposing the zinc oxide to the atmosphere and without etching the zinc oxide. FIG. 2 shows the square hysteresis loop obtained. The $H_c$ is about 3100 Oe. Etching may also play a role in helping to nucleate a Pt/Co microstructure favorable for high coercivity.

EXAMPLES 34–39

In these Examples of the invention, the indium oxide thin films were sputtered onto glass substrates in a diffusion-pumped vacuum system whose background pressure was about $5 \times 10^{-6}$ Torr ($6.7 \times 10^{-4}$ Pa). Films were sputtered at a total argon plus oxygen pressure of 8 mTorr (1.1 Pa). An oxygen partial pressure of 2 mTorr (0.27 Pa) was used. Indium film thicknesses ranged from 1000 A to 1800 A (100 nm to 180 nm). After the indium oxide films were sputtered onto the glass substrates, the substrates were removed from this chamber, thereby exposing the indium oxide film to the laboratory environment, and then transferred into another vacuum chamber for deposition of Pt/Co multilayers.

Several essentially identical indium oxide films were prepared and prior to sputtering the multilayers, some of these indium oxide films were sputter-etched under different, but mild, conditions in order to create a clean indium oxide surface layer, i.e., to remove any contamination which may have occurred when the indium oxide was exposed to the atmosphere during the transfer process.

Pt/Co multilayers were subsequently sputtered at 7 mTorr (0.94 Pa) of Kr on to indium oxide-coated glass and silicon substrates. All multilayer films were prepared by DC magnetron sputtering from separate 6.5" (16.5 cm) diameter Co and Pt targets. Forty watts was the sputtering power to each target. Substrates were on a rotatable table and were alternately coated by each metal. The substrate to target distance was about 3" (7.6 cm). There was no significant difference in results obtained with a glass substrate and those obtained with a polished silicon substrate. Glass substrates were used for the examples and experiments described herein. During deposition the rotating table was programmed to remain stationary under each target for a given time by controlling the substrate motion with a computer. Prior to deposition the vacuum chamber was pumped to a background pressure of about $2 \times 10^{31}$ 7 Torr ($2.7 \times 10^{-5}$ Pa) before admitting the sputtering gas.

In all the Examples, 10 bilayers were used. The thickness $d_{Pt}$ of the Pt layers is 11.0 A (1.1 nm) and the thickness $d_{Co}$ of the Co layers is 3.5 A (0.35 nm).

The perpendicular magnetic hysteresis loops of films indium oxide-coated were measured and $H_c$ noted. All of these multilayer films have an easy axis of magnetization perpendicular to the film plane and a magnetic squareness equal to one, that is, the remanent magnetization at zero applied field equals the saturation value.

The composition of the sputter gas used in sputtering the indium oxide films, the thickness of the indium oxide films, the sputter cleaning conditions, i.e., the voltage and time of sputtering, used to etch the indium oxide films and the $H_c$ are shown in Table II. For comparison, the same multilayer on a glass substrate with no base layer has an $H_c$ of about 850 Oe.

Multilayer films sputtered on indium oxide had substantially larger coercivities than those sputtered directly on glass. The magnitude of $H_c$ depends only weakly on the indium oxide preparation conditions and the indium oxide thickness, and more strongly on the sputter-etch or cleaning conditions. In general, when the indium oxide had been exposed to the atmosphere, etching the zinc oxide layer improved the squareness of the magnetic hysteresis loop compared to that of unetched indium oxide layers. Milder etching conditions had little effect on the magnitude of $H_c$. Larger etch voltages and longer etch times reduce $H_c$, although they improved the square shape of the hysteresis loop. If the etching voltage is too large or the etching time too long, the indium oxide surface may become roughened and this consequently decreases the coercivity. It is believed that the key role of etching is to clean and restore the indium oxide surface to its condition prior to removing the film from the vacuum chamber in which it was deposited. Therefore depositing the indium oxide layer and the Pt/Co multilayers in the same vacuum chamber may eliminate the need for sputter-etching to clean the indium oxide surface. Etching may also play a role in helping to nucleate a Pt/Co microstructure favorable for high coercivity.

TABLE I

| Example | Zinc oxide Sputter Gas | Thickness (nm) | Etch Voltage (V) | Etch Time (min) | $H_c$(Oe) |
|---|---|---|---|---|---|
| No Base Layer | | | | | 850 |
| | 7 mTorr Ar 1 mTorr O$_2$ | | | | |
| 1 | | 180 | 0 | — | 2245 |
| 2 | | 180 | −50 | 10 | 2900 |
| 3 | | 180 | −100 | 10 | 1600 |
| 4 | | 100 | 0 | — | 2270 |
| 5 | | 100 | −50 | 5 | 2190 |
| 6 | | 100 | −100 | 5 | 1242 |
| 7 | | 50 | 0 | — | 2105 |
| 8 | | 50 | −50 | 5 | 1770 |
| 9 | | 50 | −100 | 5 | 1150 |
| | 6 mTorr Ar 2 mTorr O$_2$ | | | | |
| 10 | | 400 | 0 | — | 1860 |
| 11 | | 400 | −50 | 10 | 2105 |
| 12 | | 400 | −100 | 10 | 1250 |
| 13 | | 100 | 0 | — | 1890 |
| 14 | | 100 | −50 | 10 | 1435 |
| 15 | | 100 | −75 | 7.5 | 1000 |
| 16 | | 100 | −100 | 5 | 1285 |
| 17 | | 50 | 0 | — | 1510 |

TABLE I-continued

| Example | Zinc oxide Sputter Gas | Thickness (nm) | Etch Voltage (V) | Etch Time (min) | $H_c(Oe)$ |
|---|---|---|---|---|---|
| 18 | | 50 | −50 | 5 | 1835 |
| 19 | | 50 | −50 | 10 | 1425 |
| 20 | | 50 | −75 | 7.5 | 1090 |
| 21 | | 50 | −100 | 5 | 1390 |
| | 4 mTorr Ar | | | | |
| | 4 mTorr $O_2$ | | | | |
| 22 | | 300 | 0 | — | 2100 |
| 23 | | 300 | −50 | 5 | 2715 |
| 24 | | 300 | −50 | 10 | 2015 |
| 25 | | 300 | −100 | 5 | 1450 |
| 26 | | 100 | 0 | — | 2055 |
| 27 | | 100 | −50 | 5 | 2200 |
| 28 | | 100 | −50 | 10 | 1685 |
| 29 | | 100 | −100 | 5 | 1465 |
| 30 | | 50 | 0 | — | 1755 |
| 31 | | 50 | −50 | 5 | 2055 |
| 32 | | 50 | −100 | 5 | 1400 |

TABLE II

| Example | Indium oxide Sputter Gas | Thickness (nm) | Etch Voltage (V) | Etch Time (min) | $H_c(Oe)$ |
|---|---|---|---|---|---|
| No Base Layer | | | | | 850 |
| | 6 mTorr Ar | | | | |
| | 2 mTorr $O_2$ | | | | |
| 34 | | 180 | 0 | — | 1535 |
| 35 | | 180 | −50 | 5 | 1530 |
| 36 | | 180 | −50 | 10 | 1300 |
| 37 | | 180 | −100 | 5 | 1140 |
| 38 | | 100 | 0 | — | 2380 |
| 39 | | 100 | −50 | 5 | 2320 |

The invention being claimed is:

1. A magneto-optical recording medium composed of a substrate, a base layer of zinc oxide or indium oxide sputtered onto said substrate and a multilayer recording film sputtered onto said base layer of zinc oxide or indium oxide, wherein said base layer of zinc oxide or indium oxide is from about 200 A to about 4500 A (about 20 nm to about 450 nm) thick, said multilayer recording film is a plantinum/cobalt multilayer film or a palladium/cobalt multilayer film consisting of alternating layers of platinum and cobalt or palladium and cobalt. wherein each of said palladium or plantinum layers has a thickness less than about 24 A and each of said cobalt layers has a thickness less than about 12 A, and said substrate is transparent to the radiation used to record and read, and the sputter gas used in sputtering said multilayer film is argon, krypton, xenon or a mixture thereof.

2. The magneto-optical recording medium of claim 1 wherein said base layer is zinc oxide.

3. The magneto-optical recording medium of claim 2 wherein said multilayer recording film is a platinum/cobalt multilayer film consisting of alternating layers of platinum and cobalt.

4. The magneto-optical recording medium of claim 3 wherein all said cobalt layers of said platinum/cobalt multilayer film have substantially the same thickness $d_{Co}$ and all said platinum layers of said platinum/cobalt multilayer film have substantially the same thickness $d_{Pt}$, nm) and the total thickness of the platinum/cobalt multilayer film is less than about 750 A (75 nm).

5. The magneto-optical recording medium of claim 4 wherein $d_{Co}$ is from about 2 to about 5 A (0.2 to about 0.5 nm) and $d_{Pt}/d_{Co}$ is from about 1 to about 5.

6. The magneto-optical recording medium of claim 2 wherein said base layer of zinc oxide is from about 200 A to about 2000 A (about 20 nm to about 200 nm) thick.

7. The magneto-optical recording medium of claim 6 wherein said multilayer recording film is a platinum/cobalt multilayer film consisting of alternating layers of platinum and cobalt.

8. The magneto-optical recording medium of claim 7 wherein all said cobalt layers of said platinum/cobalt multilayer film have substantially the same thickness $d_{Co}$ and all said platinum layers of said platinum/cobalt multilayer film have substantially the same thickness $d_{Pt}$, and the total thickness of the platinum/cobalt multilayer film is less than about 750 A (75 nm).

9. The magneto-optical recording medium of claim 8 wherein $d_{Co}$ is from about 2 to about 5 A (0.2 to about 0.5 nm) and $d_{Pt}/d_{Co}$ is from about 1 to about 5.

10. The magneto-optical recording medium of claim 2 wherein said sputter gas used in sputtering said multilayer film is krypton, xenon or a mixture thereof.

11. The magneto-optical recording medium of claim 10 wherein the gas pressure of said sputtering gas is about 2 to about 12 mTorr (about 0.27 to about 1.6 Pa).

12. The magneto-optical recording medium of claim 11 wherein said multilayer recording film is a platinum/cobalt multilayer film consisting of alternating layers of platinum and cobalt.

13. The magneto-optical recording medium of claim 12 wherein all said cobalt layers of said platinum/cobalt multilayer film have substantially the same $d_{Co}$ and all said platinum layers of said platinum/cobalt multilayer film have substantially the same thickness $d_{Pt}$, and the total thickness of the platinum/cobalt multilayer film is less than about 750 A (75 nm).

14. The magneto-optical recording medium of claim 13 wherein $d_{Co}$ is from about 2 to about 5 A (0.2 to about 0.5 nm) and $d_{Pt}/d_{Co}$ is from about 1 to about 5.

15. The magneto-optical recording medium of claim 6 wherein said sputter gas used in sputtering said multilayer film is krypton, xenon or a mixture thereof.

16. The magneto-optical recording medium of claim 15 wherein the gas pressure of said sputtering gas is about 2 to about 12 mTorr (about 0.27 to about 1.6 Pa).

17. The magneto-optical recording medium of claim 16 wherein said multilayer recording film is a platinum/cobalt multilayer film consisting of alternating layers of platinum and cobalt.

18. The magneto-optical recording medium of claim 17 wherein all said cobalt layers of said platinum/cobalt multilayer film have substantially the same thickness $d_{Co}$ and all said platinum layers of said platinum/cobalt multilayer film have substantially the same thickness $d_{Pt}$, and the total thickness of the platinum/cobalt multilayer film is less than about 750 A (75 nm).

19. The magneto-optical recording medium of claim 18 wherein $d_{Co}$ is from about 2 to about 5 A (0.2 to about 0.5 nm) and $d_{Pt}/d_{Co}$ is from about 1 to about 5.

20. The magneto-optical recording medium of claim 1 wherein said base layer is indium oxide.

21. The magneto-optical recording medium of claim 20 wherein said multilayer recording film is a platinum/cobalt multilayer film consisting of alternating layers of platinum and cobalt.

22. The magneto-optical recording medium of claim 21 wherein all said cobalt layers of said platinum/cobalt multilayer film have substantially the same thickness $d_{Co}$ and all said platinum layers of said platinum/cobalt multilayer film have substantially the same thickness $d_{Pt}$, and the total thickness of the platinum/cobalt multilayer film is less than about 750 A (75 nm).

23. The magneto-optical recording medium of claim 22 wherein $d_{Co}$ is from about 2 to about 5 A (0.2 to about 0.5 nm) and $d_{Pt}/d_{Co}$ is from about 1 to about 5.

24. The magneto-optical recording medium of claim 20 wherein said base layer of indium oxide is from about 200 A to about 2000 A (about 20 nm to about 200 nm) thick.

25. The magneto-optical recording medium of claim 24 wherein said multilayer recording film is a platinum/cobalt multilayer film consisting of alternating layers of platinum and cobalt.

26. The magneto-optical recording medium of claim 25 wherein all said cobalt layers of said platinum/cobalt multilayer film have substantially the same thickness $d_{Co}$ and all said platinum layers of said platinum/cobalt multilayer film have substantially the same thickness $d_{Pt}$, and the total thickness of the platinum/cobalt multilayer film is less than about 750 A (75 nm).

27. The magneto-optical recording medium of claim 26 wherein $d_{Co}$ is from about 2 to about 5 A (0.2 to about 0.5 nm) and $d_{Pt}/d_{Co}$ is from about 1 to about 5.

28. The magneto-optical recording medium of claim 20 wherein said sputter gas used in sputtering said multilayer film is krypton, xenon or a mixture thereof.

29. The magneto-optical recording medium of claim 28 wherein the gas pressure of said sputtering gas is about 2 to about 12 mTorr (about 0.27 to about 1.6 Pa).

30. The magneto-optical recording medium of claim 29 wherein said multilayer recording film is a platinum/cobalt multilayer film consisting of alternating layers of platinum and cobalt.

31. The magneto-optical recording medium of claim 30 wherein all said cobalt layers of said platinum/cobalt multilayer film have substantially the same thickness $d_{Co}$ and all said platinum layers of said platinum/cobalt multilayer film have substantially the same thickness $d_{Pt}$, and the total thickness of the platinum/cobalt multilayer film is less than about 750 A (75 nm).

32. The magneto-optical recording medium of claim 31 wherein $d_{Co}$ is from about 2 to about 5 A (0.2 to about 0.5 nm) and $d_{Pt}/d_{Co}$ is from about 1 to about 5.

33. The magneto-optical recording medium of claim 24 wherein said sputter gas used in sputtering said multilayer film is krypton, xenon or a mixture thereof.

34. The magneto-optical recording medium of claim 33 wherein the gas pressure of said sputtering gas is about 2 to about 12 mTorr (about 0.27 to about 1.6 Pa).

35. The magneto-optical recording medium of claim 34 wherein said multilayer recording film is a platinum/cobalt multilayer film consisting of alternating layers of platinum and cobalt.

36. The magneto-optical recording medium of claim 35 wherein all said cobalt layers of said platinum/cobalt multilayer film have substantially the same thickness $d_{Co}$ and all said platinum layers of said platinum/cobalt multilayer film have substantially the same thickness $d_{Pt}$, and the total thickness of the platinum/cobalt multilayer film is less than about 750 A (75 nm).

37. The magneto-optical recording medium of claim 36 wherein $d_{Co}$ is from about 2 to about 5 A (0.2 to about 0.5 nm) and $d_{Pt}/d_{Co}$ is from about 1 to about 5.

* * * * *